US005815597A

United States Patent [19]

Horner et al.

[11] Patent Number: 5,815,597

[45] Date of Patent: Sep. 29, 1998

[54] BINARY ENCODING OF GRAY SCALE NONLINEAR JOINT TRANSFORM CORRELATORS

[75] Inventors: Joseph L. Horner, Belmont, Mass.; Bahram Javidi, Storrs, Conn.

[73] Assignee: The United States of America as represented by the Secretary of the Air Force, Washington, D.C.

[21] Appl. No.: 865,564

[22] Filed: Apr. 9, 1992

[51] Int. Cl.[6] ..................... G06K 9/64

[52] U.S. Cl. ..................... 382/211; 382/270; 382/278; 359/561; 364/822

[58] Field of Search ..................... 382/42, 31, 50, 382/278, 270, 310, 211; 364/822; 359/560, 561, 559

[56] References Cited

U.S. PATENT DOCUMENTS

| | | | |
|---|---|---|---|
| 4,832,447 | 5/1989 | Javidi | 364/822 |
| 4,949,389 | 8/1990 | Allebach et al. | 382/211 |
| 5,040,140 | 8/1991 | Horner | 382/210 |
| 5,119,443 | 6/1992 | Javidi et al. | 382/211 |

*Primary Examiner*—Joseph Mancuso
*Assistant Examiner*—Jou Chang
*Attorney, Agent, or Firm*—Robert L. Nathans

[57] ABSTRACT

A joint Fourier transform optical correlator is disclosed which can have varying degrees of nonlinearity and yet employ a readily available binary spatial light modulator for producing the correlation output light signal in conjunction with a Fourier transform lens. The nonlinearly transformed joint power spectrum is binarized utilizing a multiple level threshold function which can vary from one pixel to the next.

10 Claims, 4 Drawing Sheets

AUTOCORRELATION RESULTS

| TECHNIQUE | K | Ip | SNR | PSR | FWHM* FWHMX | FWHM* FWHMY |
|---|---|---|---|---|---|---|
| BINARY ENCODED KTH LAW NONLINEARLY TRANSFORM JPS | 1 | 1 | 44.1 | 6.8 | 3 | 3 |
| | 0.5 | 14 | 182 | 40 | 1 | 1 |
| | 0 | 750 | 335 | 21807 | 1 | 1 |
| GRAYSCALE KTH LAW NONLINEARLY TRANSFORMED JPS | 1 | 2.2 | 44.6 | 5.6 | 3 | 3 |
| | 0.5 | 21 | 199 | 39 | 1 | 1 |
| | 0 | 750 | 335 | 21807 | 1 | 1 |

FWHM* IS THE FULL WIDTH OF THE CORRELATION SIGNAL AT ITS HALF VALUE.

BINARY ENCODING OF GRAY SCALE NONLINEAR JOINT TRANSFORM CORRELATORS

STATEMENT OF GOVERNMENT INTEREST

The invention described herein may be manufactured and used by or for the Government for governmental purposes without the payment of any royalty thereon.

BACKGROUND OF THE INVENTION

It has been shown that nonlinear joint transform correlators (JTCs) produce reasonably good correlation performance in terms of correlation peak intensity, peak to sidelobe ratio, and correlation width. Various types of correlation signals are obtained by varying the nonlinear transformation of the joint power spectrum (JPS). See our U.S. Pat. No. 5,119,443, incorporated by reference herein. A binary JTC is obtained by binarizing the JPS and can be implemented using a binary spatial light modulator (SLM) in the Fourier plane. Implementation of a nonlinear JTC with a general type of nonlinear transformation requires a gray scale SLM in the Fourier plane. However, binary SLMs are more widely available.

BRIEF SUMMARY OF THE INVENTION

The present invention employs a method of thresholding the joint power spectrum and displaying it on the more desirable binary SLM while attaining the same performance as if the gray scale SLM had been employed. We implement a nonlinear JTC with various degrees of nonlinear transformation using a binary encoding of the joint power spectrum. The nonlinearly transformed JPS is binarized using a multiple level threshold function such that the first order correlation signal produced by the binary encoded JPS is equivalent to the first order correlation signal produced by the gray scale nonlinearly transformed JPS. The binarized interference intensity can be considered as an infinite sum of harmonic terms. The amplitude modulation of each harmonic term is dependent on the threshold function. By selecting a proper threshold function to binarize the joint power spectrum, a nonlinear JTC for a general type of nonlinearity is produced for the first order correlation term. Advantageously, the binary encoded JPS can be written onto a binary SLM in the Fourier plane and the need for a gray scale SLM is eliminated.

BRIEF DESCRIPTION OF THE DRAWINGS

Other objects, features and advantages of the invention will become apparent upon study of the following description taken in conjunction with the figures in which.

DETAILED DESCRIPTION OF A PREFERRED EMBODIMENT OF THE INVENTION

Figure 1:
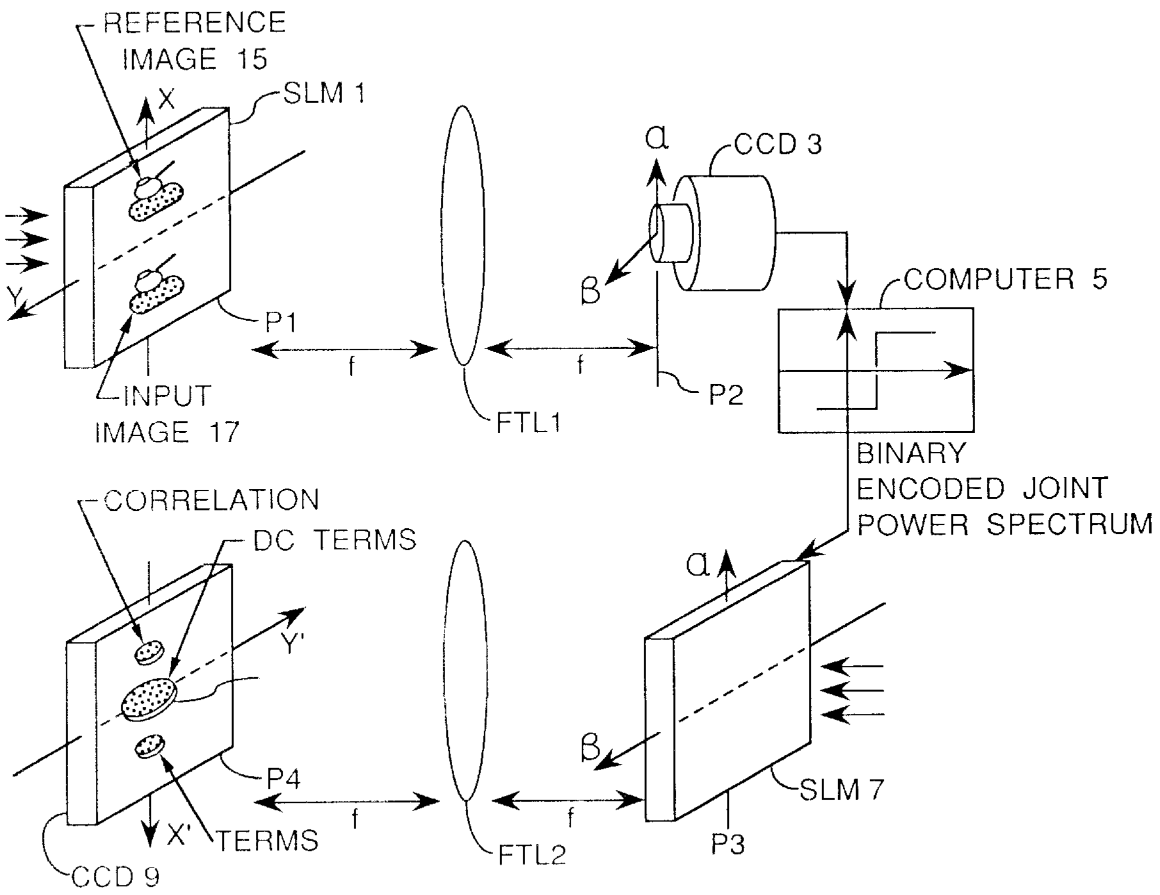
FIG. 1 illustrates a preferred apparatus in carrying out the method of the invention.

Implementation of a $K^{th}$ nonlinear joint correlator with a binary encoding of the JPS using an electrically addressed SLM in the Fourier plane is shown in FIG. 1. Plane $P_1$ is the input plane that contains the reference image signal 15 and the input image signal 17 written into SLM 1, illuminated by coherent light. The images are then Fourier transformed by Lens $FTL_1$ and the interference pattern between the Fourier transforms of the input signal and the reference signal is produced at plane $P_2$. The intensity of the Fourier transform interference pattern is obtained by CCD image sensor array 3 located at plane $P_2$. This joint power spectrum (JPS) is processed by computer 5 and the resulting binary encoded JPS is inserted into SLM 7, illuminated by coherent light. The JPS is binarized by computer 5 using a precomputed threshold value to produce the binary representation of the nonlinearly transformed JPS which is electrically written into binary SLM 7 located at plane P3 and which is used to read out the now binarized JPS. The correlation functions can be produced at plane $P_4$ by providing transform lens FTL2, which takes the inverse Fourier transform of the binarized interference intensity distribution at plane $P_3$. CCD image sensor 9 may be employed to measure the intensity of the output signals as is well known. See for example, U.S. Pat. No. 5,086,483.

The reference signal and the input signal located at plane $P_1$ are denoted by $r(x+x_0,y)$ and $s(x-x_0,y)$, respectively. The Fourier transform interference intensity distribution at plane $P_2$ can be written as:

$$E(\alpha,\beta)=I^2(\alpha,\beta)=S^2(\alpha,\beta)+R^2(\alpha,\beta)+S(\alpha,\beta)\exp(i\Phi_S(\alpha,\beta))R(\alpha,\beta)\exp(-i\Phi_R(\alpha,\beta))\exp(-i2x_0\alpha)+S(\alpha,\beta)\exp(-i\Phi_S(\alpha,\beta))R(\alpha,\beta)\exp(i\Phi_R(\alpha,\beta))\exp(i2x_0\alpha) \quad (1)$$

where $(\alpha,\beta)$ are the spatial frequency coordinates, and $S(\alpha,\beta)\exp(i\Phi_S(\alpha,\beta))$ and $R(\alpha,\beta)\exp(i\Phi_R(\alpha,\beta))$ correspond to the Fourier transforms of the input signal s(x,y) and the reference signal r(x,y), respectively.

In the conventional JTC, the inverse Fourier transform of Eq. (1) produces the correlation signals at the output plane. The first two terms produce the autocorrelation terms, and the third term and the fourth term produce the correlations of the reference signal and the input signal. In a binary JTC, the Fourier interference intensity provided by the CCD array is binarized to two values +1 and −1 according to the threshold value $V_T$ before the inverse Fourier transform operation is applied. The binarized joint power spectrum $E_B(\alpha,\beta;V_T)$ is given by:

$$E_B(\alpha,\beta;V_T)=\begin{cases}+1, & E(\alpha,\beta)>V_T(\alpha,\beta)\\ -1, & E(\alpha,\beta)<V_T(\alpha,\beta)\end{cases} \quad (2)$$

For the autocorrelation case, we assume that $R(\alpha,\beta)$, $=(\alpha,\beta)$ and $\Phi_S(\alpha,\beta)$ are slowly varying functions. The binarization converts the amplitude modulated interference intensity to a series of binary transmittance pulses which can be considered as an infinite sum of harmonic terms. See B. Javidi, "Nonlinear Joint Power Spectrum Based Optical Correlation" Applied Optics 28, 2358 (1989). Each harmonic term is phase modulated by v times the Fourier phase of the joint power spectrum $\{v[2x_0\alpha+\Phi_S(\alpha,\beta)-\Phi_R(\alpha,\beta)]\}$ where v is the order of the harmonic term. The correct phase information can be recovered for the first order harmonic term. If the input signal and the reference signal are the same, the first order harmonic term of the binarized JPS that generates the first order autocorrelation signal for v=+1 is given by:

$$E_{1a}(\alpha,\beta)=2A_{1a}e^{i2x_0\alpha} \quad (3)$$

Here, the subscript a stands for autocorrelation, and $A_{1a}$ is the amplitude modulation:

$$A_{1a}=\frac{1}{\pi}\sqrt{1-\left[\frac{2R^2(\alpha,\beta)-V_T(\alpha,\beta)}{2R(\alpha,\beta)^2}\right]^2}\ . \qquad (4)$$

The amplitude modulation of the first order harmonic term can be controlled by varying the threshold function $V_T(\alpha,\beta)$ according to the above equation.

A kth law nonlinear JTC can be produced by apply an odd kth law nonlinear transformation to the JPS. See B. Javidi, ibid. The odd $k^{th}$ law nonlinearity is $E_k=|E|^k\,\mathrm{sgn}(E)$ where E is the JPS, $E_k$ is the nonlinearly transformed JPS, and sgn is the signum function. In this case, the first order (v=1) harmonic term $E_{k1}(\alpha,\beta;\,k)$ produced by nonlinearly transforming the cross-product terms of the JPS is given by:

$$E_{k1}(\alpha,\beta;k)=\Gamma(k+1)\{\Gamma(0.5+k/2)\Gamma(1.5+k/2)\}^{-1}[R(\alpha,\beta)S(\alpha,\beta)]^k \exp\{i[2x_0\alpha+\Phi_S(\alpha,\beta)-\Phi_R(\alpha,\beta)]\}, \qquad (5)$$

where Γ(.) is the gamma function. For the autocorrelation function, $R(\alpha,\beta)=S(\alpha,\beta)$ and $\Phi_R(\alpha,\beta)=\Phi_S(\alpha,\beta)$, and the amplitude modulation becomes proportional to $c_k[R(\alpha,\beta)]^{2k}$, where $c_k=\Gamma(k+1)\{\Gamma(0.5+k/2)\Gamma(1.5+k/2\})^{-1}$.

The function $V_T(\alpha,\beta)$ in Eq. (4) is selected such that the amplitude modulation of the first order harmonic term of the binarized JPS becomes equal to the amplitude modulation of the first order harmonic term of the $k^{th}$ law nonlinearly transformed JPS given. For autocorrelation, this condition can be written as:

$$\sqrt{1-\left[\frac{2R^2(\alpha,\beta)-V_T(\alpha,\beta)}{2R(\alpha,\beta)^2}\right]^2}=c_k[R(\alpha,\beta)]^{2k} \qquad (6)$$

where k is assumed to be a known constant. The threshold function is computed from the above equation:

$$V_T(\alpha,\beta{:}\,k)=2R^2(\alpha,\beta)\left[1+\sqrt{1-c_k^2R^{4k}(\alpha,\beta)}\right] \qquad (7)$$

Using this threshold function, the first order harmonic term of the binarized JPS can be expressed as:

$$E_{1a}(\alpha,\beta,V_T)=\frac{2}{\pi}\,c_kR^{2k}(\alpha,\beta)e^{i2x_0\alpha} \qquad (8)$$

It can be seen that $E_{1a}(\alpha,\beta,V_T)$ will produce an autocorrelation signal that is identical to the autocorrelation signal obtained by a $k^{th}$ law nonlinear transformation applied to the cross-product terms of the JPS. Thus, various types of $k^{th}$ law nonlinear autocorrelation signals can be produced simply by selecting the values of k, computing $V_T(\alpha,\beta;k)$, and binarizing the JPS. Using this technique, the $k^{th}$ law nonlinear JTC is implemented with a binary SLM at the Fourier plane. A conventional JTC (k=1) as well as the JTC corresponding to any arbitrary value of k may be implemented with a binary SLM at the Fourier plane.

Figure 2A:
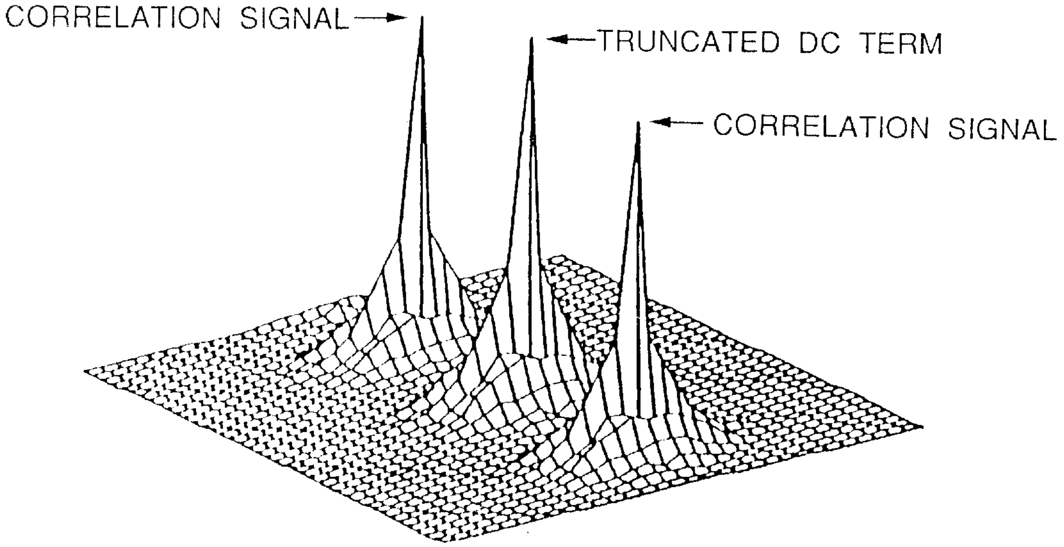
FIGS. 2(*a*)–2(*c*) illustrate the inverse Fourier transforms of the binary encoded JPS.
Figure 2B:
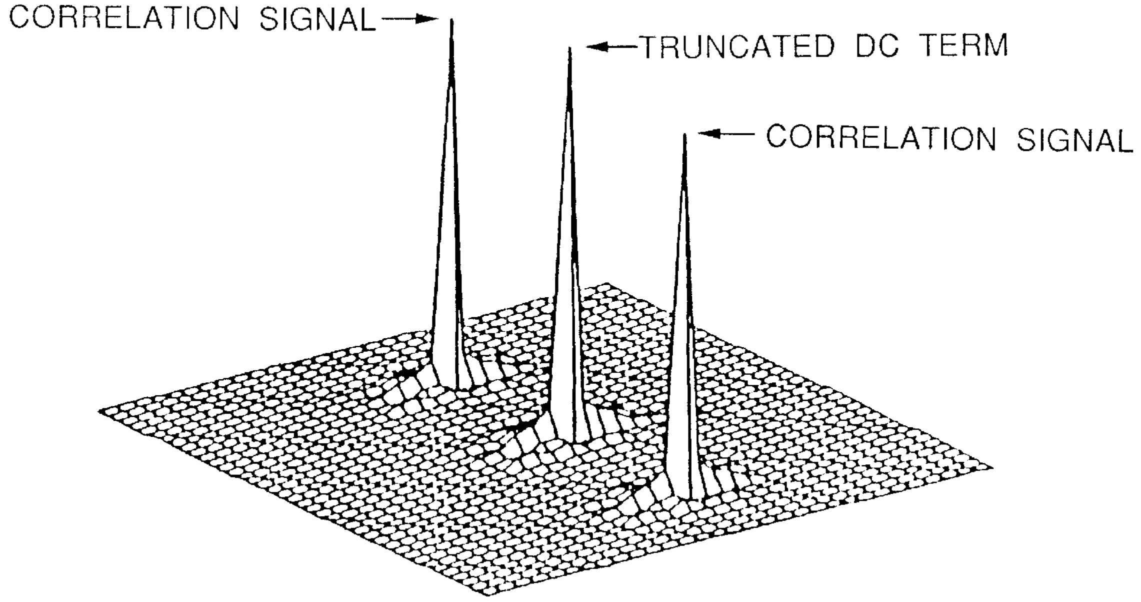
Figure 2C:
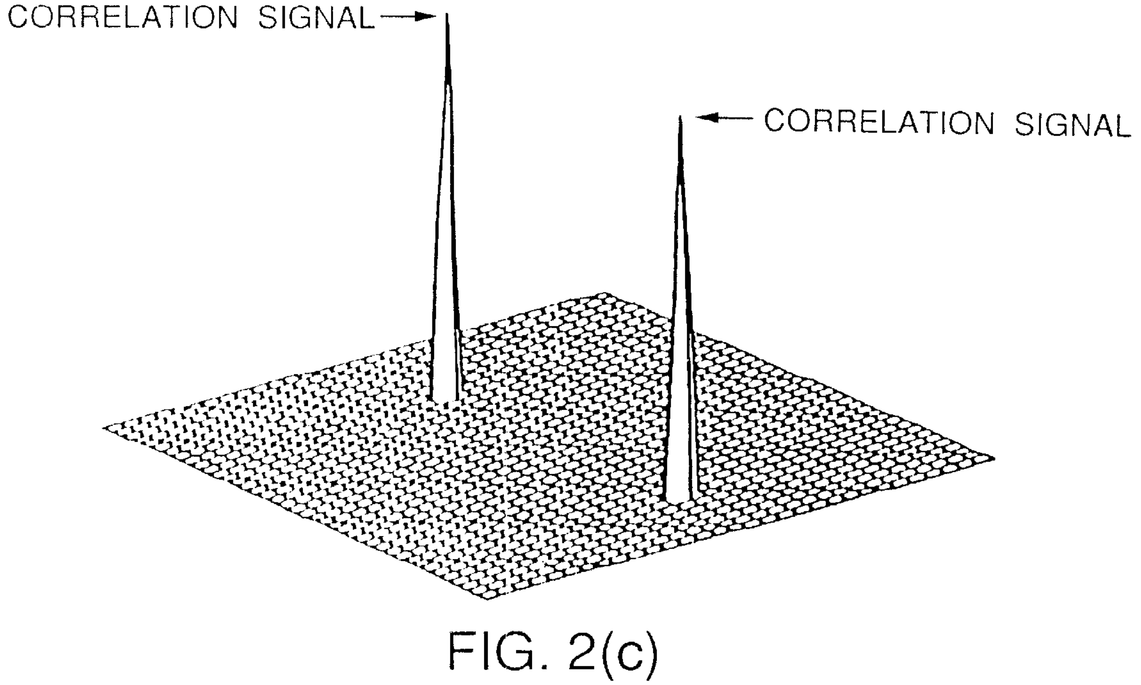

A numerical analysis of the nonlinear JTC using binary encoding at the Fourier plane is provided. The $k^{th}$ law nonlinear correlation signals are determined for different values of k. To study the performance of the proposed system, we used a 128×512 point 2-D FFT and the results are plotted using a 3-D plotting subroutine. The autocorrelation tests were performed for the image of a tank. The threshold function $V_T(\alpha,\beta;k)$ was determined according to Eq. (7) by selecting k and evaluating the Fourier magnitude $R(\alpha,\beta)$. The joint power spectrum was binarized using $V_T(\alpha,\beta)$ [see Eq. (2)]. An inverse Fourier transform was applied to the thresholded JPS to obtain the autocorrelation signals. The autocorrelation signals for the binary encoded $k^{th}$ law nonlinearly transformed JPS are shown in FIG. (2). Here, FIGS. 2(*a*), 2(*b*) and 2(*c*) correspond to the inverse Fourier transform of the binary encoded JPS that represents k=1, ½ and 0; respectively.

Figure 3A:
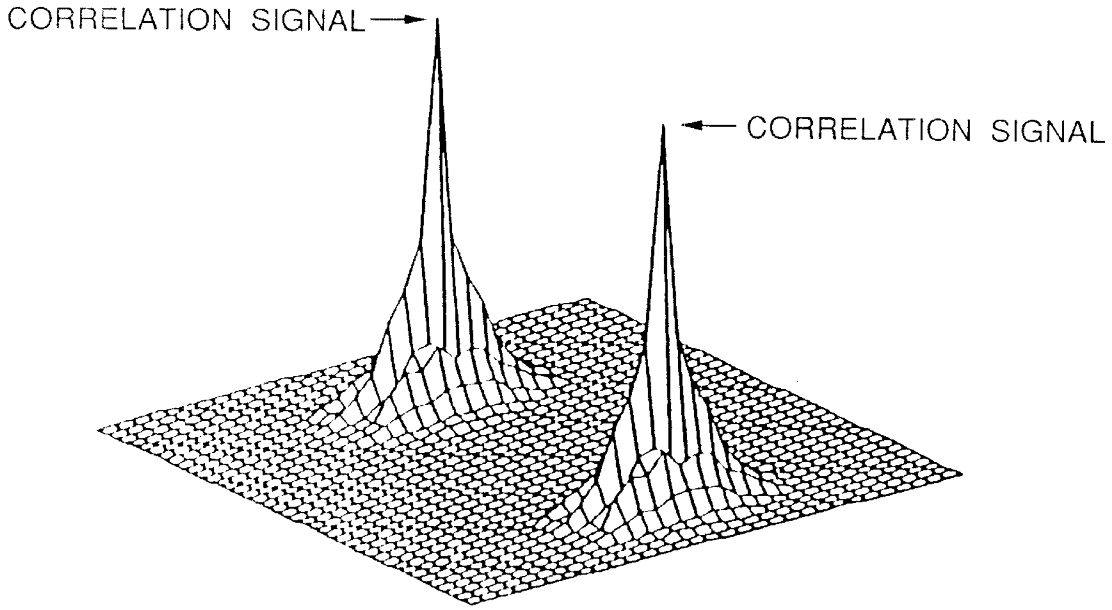
FIGS. 3(*a*)–3(*c*) illustrate the inverse Fourier transforms of the JPS transformed by a kth law nonlinearity.
Figure 3B:
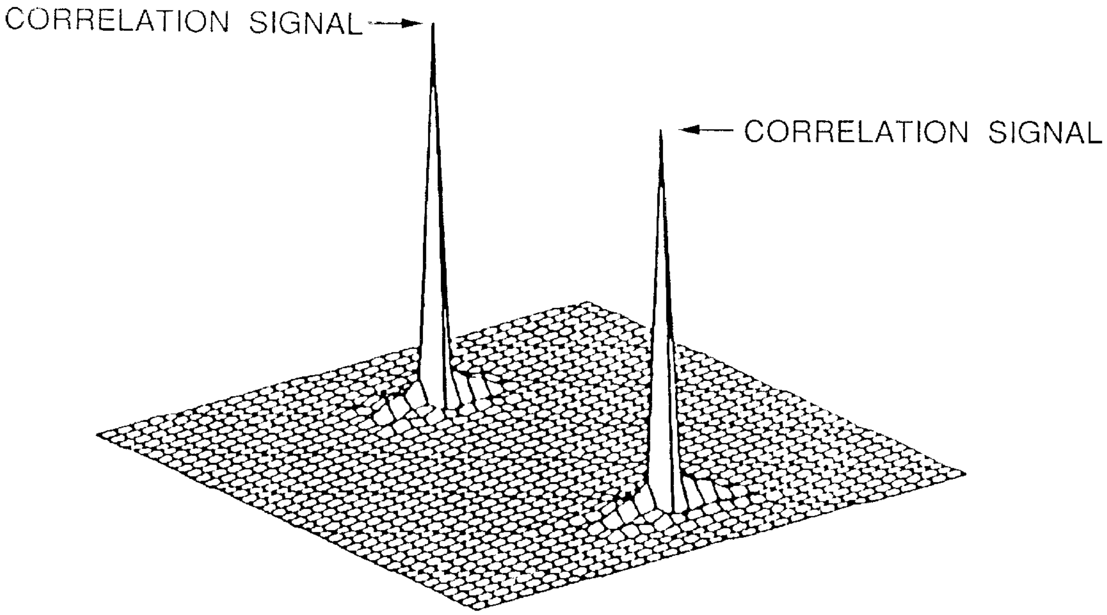
Figures 3C, 4:
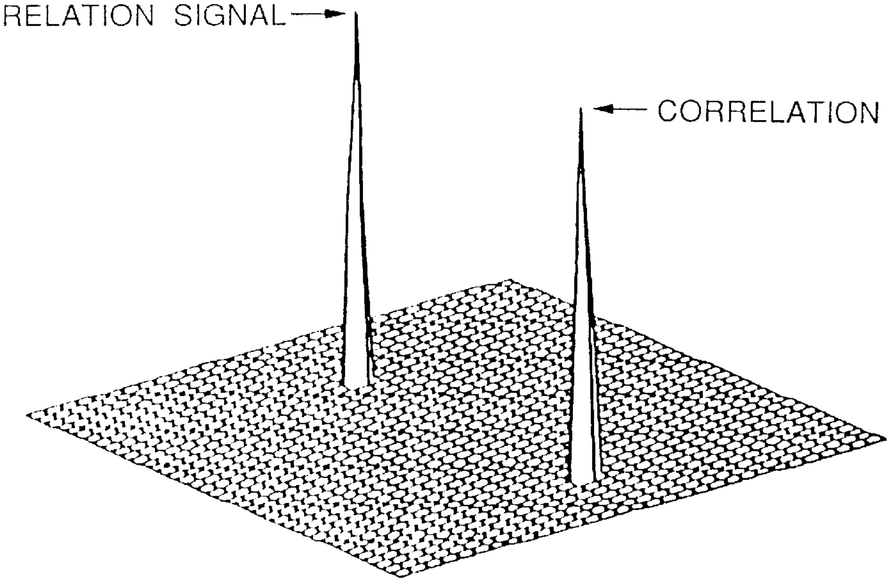
FIG. 4 sets forth data relating to FIGS. 2 and 3.

The first order autocorrelation results of FIG. (2) are shown in FIG. 4. The correlation peak intensities are normalized by that of the linear JTC. In the computer simulations, the peak to sidelobe ratio (PSR) is defined as the ratio of the correlation peak intensity $I_p$ to the maximum correlation sidelobe intensity. The signal to noise ratio (SNR) is defined as the ratio of the correlation peak intensity $I_p$ to the standard deviation of the noise intensity $$\left[\sum_i^{N_1}\sum_j^{N_2}|n(x_i,y_j)-\overline{n(x_i,y_j)}|^2/N'_1N'_2\right]^{1/2}.$$

Here, $n(x_i,y_j)$ is the noise intensity outside the 50% response portion of the correlation peak intensity, $N_1$ and $N_2$ are the total number of pixels of the area where the correlation response is measured, and $N'_1$ and $N'_2$ are the number of pixels under the 50% response portion of the correlation spot. Here, we use $N_1=N_2=64$ pixels. $\overline{n(x_i,y_j)}$ is the average value of the $n(x_i,y_j)$ for the $N'_1N'_2$ pixels.

The autocorrelation signals for the $k^{th}$ law nonlinear JTC are shown in FIGS. 3(*a*), 3(*b*) and 3(*c*) for k=1, ½ and 0, respectively, ibid. Here, the JPS is transformed by a $k^{th}$ law nonlinearity and contains gray scale. The first order autocorrelation results are presented in FIG. 4. It can be seen from FIGS. 2–4 that the first order autocorrelation signals produced by the binary encoded JPS is similar to the first order autocorrelation signals produced by the gray scale $k^{th}$ law nonlinearly transformed JPS.

In summary, we have described a $k^{th}$ law nonlinear joint transform image correlator that uses binary encoding of the Fourier transform interference intensity. The threshold function is computed such that the binarized JPS produces a first order autocorrelation signal which is the same as the first order autocorrelation signal produced by a $k^{th}$ law nonlinearly transformed grayscale JPS. The performance of the $k^{th}$ law nonlinear JTC and its binary implementation is presented for K=1, ½ and 0. The results indicate that the first order autocorrelation signals produced by the $k^{th}$ law nonlinear gray scale JTCs are equivalent to the first order autocorrelation signals produced by the binary encoded representation.

As other embodiments of the invention will become apparent to the skilled worker in the art, the scope of the invention is to be restricted only by the terms of the following claims and art recognized equivalents thereof.

We claim:

1. An image correlation method employing a joint transform correlator comprising the steps of:

(a) providing a joint image of a reference image and an input image;

(b) producing a joint power spectrum of Fourier transforms of the reference image and the input image in a Fourier plane of said joint transform correlator;

(c) binarizing said joint power spectrum by (c-1) producing different threshold values associated with different pixels of said joint power spectrum by computing a threshold function in accordance with the following equation:

$$V_T(\alpha, \beta: k) = 2R^2(\alpha, \beta)\,[1 + \sqrt{1 - \alpha_k{}^2 R^{4k}(\alpha, \beta)}\;]$$

where $V_T$ is the threshold value for binarizing the joint power spectrum; where (α,β) are the spatial frequency coordinates; where k is a known constant; and where R is the Fourier transform of the reference signal r;

(c-2) producing a binarized version of said joint power spectrum by binarizing said joint power spectrum in accordance with said threshold values; and (d) inverse Fourier transforming said binarized version of said joint power spectrum for producing a correlation signal indicative of the degree of correlation between the reference image and the input image.

2. The method of claim 1 wherein each pixel of the joint power spectrum is individually binarized in accordance with step (c).

3. The method of claim 1 including the step of varying the value of k in said equation to produce various types of nonlinear correlation signals.

4. The method of claim 2 including the step of varying the value of k in said equation to produce various types of nonlinear correlation signals.

5. The method of claim 1 including writing binary signals produced in accordance with step (c) into a binary spatial light modulator and wherein step (d) includes directing coherent light through the binary spatial light modulator and through a Fourier transform lens.

6. The method of claim 2 including writing binary signals produced in accordance with step (c) into a binary spatial light modulator and wherein step (d) includes directing coherent light through the binary spatial light modulator and through a Fourier transform lens.

7. The method of claim 3 including writing binary signals produced in accordance with step (c) into a binary spatial light modulator and wherein step (d) includes directing coherent light through the binary spatial light modulator and through a Fourier transform lens.

8. The method of claim 4 including writing binary signals produced in accordance with step (c) into a binary spatial light modulator and wherein step (d) includes directing coherent light through the binary spatial light modulator and through a Fourier transform lens.

9. A joint transform correlator comprising:

(a) means for providing a joint image of a reference image and an input image;

(b) means for producing a joint power spectrum of Fourier transforms of the reference image and the input image in a Fourier plane of said joint transform correlator;

(c) means for producing different threshold values associated with different pixels of said joint power spectrum by computing a threshold function in accordance with the following equation:

$$V_T(\alpha, \beta: k) = 2R^2(\alpha, \beta)\,[1 + \sqrt{1 - \alpha_k{}^2 R^{4k}(\alpha, \beta)}\;]$$

where $V_T$ is the threshold value for binarizing the joint power spectrum; where (α,β) are the spatial frequency coordinates; where k is a known constant; and where R is the Fourier transform of the reference signal r;

(d) means for binarizing said joint power spectrum in accordance with said threshold values; and (e) means for inverse Fourier transforming the binarized version of said joint power spectrum for producing a correlation signal indicative of the degree of correlation between the reference image and the input image.

10. The correlator of claim 9 wherein said means for binasizing includes means for individually binarizing each pixel of said joint power spectrum.

* * * * *